(12) United States Patent
Nguyen et al.

(10) Patent No.: US 8,441,934 B2
(45) Date of Patent: May 14, 2013

(54) EFFICIENT UE QOS/UL PACKET BUILD IN LTE

(75) Inventors: Bao V. Nguyen, Corona, CA (US); Vanitha A. Kumar, San Diego, CA (US); Srividhya Krishnamoorthy, San Diego, CA (US); Shailesh Maheshwari, San Diego, CA (US); Ashwini Raina, Poway, CA (US); Yateesh S. Gowda, Solana Beach, CA (US); Gang A. Xiao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 521 days.

(21) Appl. No.: 12/616,031

(22) Filed: Nov. 10, 2009

(65) Prior Publication Data

US 2010/0118892 A1    May 13, 2010

Related U.S. Application Data

(60) Provisional application No. 61/113,452, filed on Nov. 11, 2008.

(51) Int. Cl.
*H04J 3/14* (2006.01)
(52) U.S. Cl.
USPC ...................................................... 370/235.1
(58) Field of Classification Search .......... 370/329–349, 370/235–238.1
See application file for complete search history.

(56) References Cited

U.S. PATENT DOCUMENTS 5,414,697 A * 5/1995 Osaki ............................ 370/236
2003/0163589 A1   8/2003 Bunce et al.
2004/0264486 A1* 12/2004 Sankey et al. ................. 370/412
2005/0207343 A1*  9/2005 Han, II .......................... 370/235
2007/0070908 A1*  3/2007 Ghosh et al. .................. 370/236
2007/0156928 A1*  7/2007 Raghunandan ............... 709/251
2008/0225725 A1*  9/2008 Wang et al. ................ 370/235.1
2010/0135229 A1*  6/2010 Lohr et al. ..................... 370/329
2012/0230195 A1*  9/2012 Khivesara et al. ............ 370/235

FOREIGN PATENT DOCUMENTS

WO    WO0150679 A2    7/2001

OTHER PUBLICATIONS

International Search Report and Written Opinion—PCT/US2009/064052, International Searching Authority—European Patent Office, Apr. 6, 2010.
Kumar, H. Shravan: "Design implementation of WiFiRe MAC Layer Protocol" Indian Institute of Technology, Bombay, India, Jul. 16, 2007, pp. 1-60, XP002574374, 2.3 Programming components.

(Continued)

*Primary Examiner* — Jeffrey M Rutkowski
*Assistant Examiner* — Juvena Loo
(74) *Attorney, Agent, or Firm* — François A. Pelaez

(57) ABSTRACT

An apparatus for wireless communication includes a processing system. The processing system is configured to perform a first set of functions in a first thread. The first set of functions includes obtaining second data from a second thread and providing first data to the second thread to facilitate construction of an uplink packet in the second thread. The processing system is further configured to perform a second set of functions in the second thread. The second set of functions includes obtaining the first data, constructing the uplink packet based on the first data, and providing the second data to the first thread to facilitate the performing of the first set of functions.

44 Claims, 10 Drawing Sheets

OTHER PUBLICATIONS

Lee, Seung-Que, et al., "An Execution Model of MAC on System Kernel for WiBro Access Terminal" Advanced Communication Technology, 2008. ICACT 2008. 10th International Conference on, IEEE, Piscataway, NJ, USA, Feb. 17, 2008, pp. 1066-1069, XP031245305.

* cited by examiner

EFFICIENT UE QOS/UL PACKET BUILD IN LTE

CROSS-REFERENCE TO RELATED APPLICATION(S)

Pursuant to 35 U.S.C. §119(e), this application claims the benefit of U.S. Provisional Application Ser. No. 61/113,452 filed on Nov. 11, 2008, the contents of which are hereby incorporated by reference herein in their entirety.

BACKGROUND

1. Field

The present disclosure relates generally to user equipment (UE) quality of service (QoS)/uplink (UL) packet build in 3GPP Long Term Evolution (LTE), and more particularly, to an efficient implementation of the UE QoS/UL packet build in LTE.

2. Background

Wireless communication systems are widely deployed to provide various telecommunication services such as telephony, video, data, messaging, and broadcasts. Typical wireless communication systems may be multiple-access systems capable of supporting communication with multiple users by sharing available system resources (e.g., bandwidth, transmit power). Examples of such multiple-access systems include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems. The systems can conform to specifications of the Third Generation Partnership Project (3GPP), such as, for example, LTE. LTE is a set of enhancements to the Universal Mobile Telecommunications System (UMTS) mobile standard in order to improve spectral efficiency, lower costs, improve services, make use of new spectrum, and better integrate with other open standards.

Generally, wireless multiple-access communication systems may simultaneously support communication for multiple UEs. Each UE may communicate with a base station (BS) via transmissions on forward and reverse links. The forward link (or downlink (DL)) refers to the communication link from the BSs to UEs, and the reverse link (or uplink (UL)) refers to the communication link from UEs to the BSs. Communications between UEs and BSs may be established via single-input single-output (SISO) systems, single-input multiple-output (SIMO) systems, multiple-input single-output (MISO) systems, multiple-input multiple-output (MIMO) systems. UEs can communicate with other UEs (and/or BSs with other BSs) in peer-to-peer wireless network configurations.

In an LTE network, UEs are complex personal communication systems that can service simultaneously multiple highly time sensitive applications such as video conference, Voice over Internet Protocol (VoIP), and high definition interactive games, while providing heavy data throughput such as file downloading. Each of these applications requires different QoS that the UE must strictly follow. These application QoS requirements coupled with the LTE high data rate and the LTE short timing frame duration can put a heavy burden on the UE CPU. In LTE, the timing frame duration, or transmission time interval (TTI) is 1 ms. In LTE, for every TTI, a medium access control (MAC) packet data unit (PDU) may be constructed. Because in LTE the TTI is short, there is a need to improve or optimize the UE QoS/UL packet build to reduce the burden on the CPU of the UE during a critical time.

SUMMARY

In an aspect of the disclosure, a method of wireless communication includes performing a first set of functions in a first thread and performing a second set of functions in the second thread. The first set of functions includes obtaining second data from a second thread and providing first data to the second thread to facilitate construction of an uplink packet in the second thread. The second set of functions includes obtaining the first data, constructing the uplink packet based on the first data, and providing the second data to the first thread to facilitate the performing of the first set of functions.

In an aspect of the disclosure, an apparatus for wireless communication includes a processing system. The processing system is configured to perform a first set of functions in a first thread. The first set of functions includes obtaining second data from a second thread and providing first data to the second thread to facilitate construction of an uplink packet in the second thread. The processing system is further configured to perform a second set of functions in the second thread. The second set of functions includes obtaining the first data, constructing the uplink packet based on the first data, and providing the second data to the first thread to facilitate the performing of the first set of functions.

In an aspect of the disclosure, an apparatus for wireless communication includes means for performing a first set of functions in a first thread. The first set of functions includes obtaining second data from a second thread and providing first data to the second thread to facilitate construction of an uplink packet in the second thread. The apparatus further includes means for performing a second set of functions in the second thread. The second set of functions includes obtaining the first data, constructing the uplink packet based on the first data, and providing the second data to the first thread to facilitate the performing of the first set of functions.

In an aspect of the disclosure, a computer program product for wireless communication includes a computer-readable medium. The computer-readable medium includes code for performing a first set of functions in a first thread and performing a second set of function in a second thread. The first set of functions includes obtaining second data from the second thread and providing first data to the second thread to facilitate construction of an uplink packet in the second thread. The second set of functions includes obtaining the first data, constructing the uplink packet based on the first data, and providing the second data to the first thread to facilitate the performing of the first set of functions.

DETAILED DESCRIPTION

Figure 1:
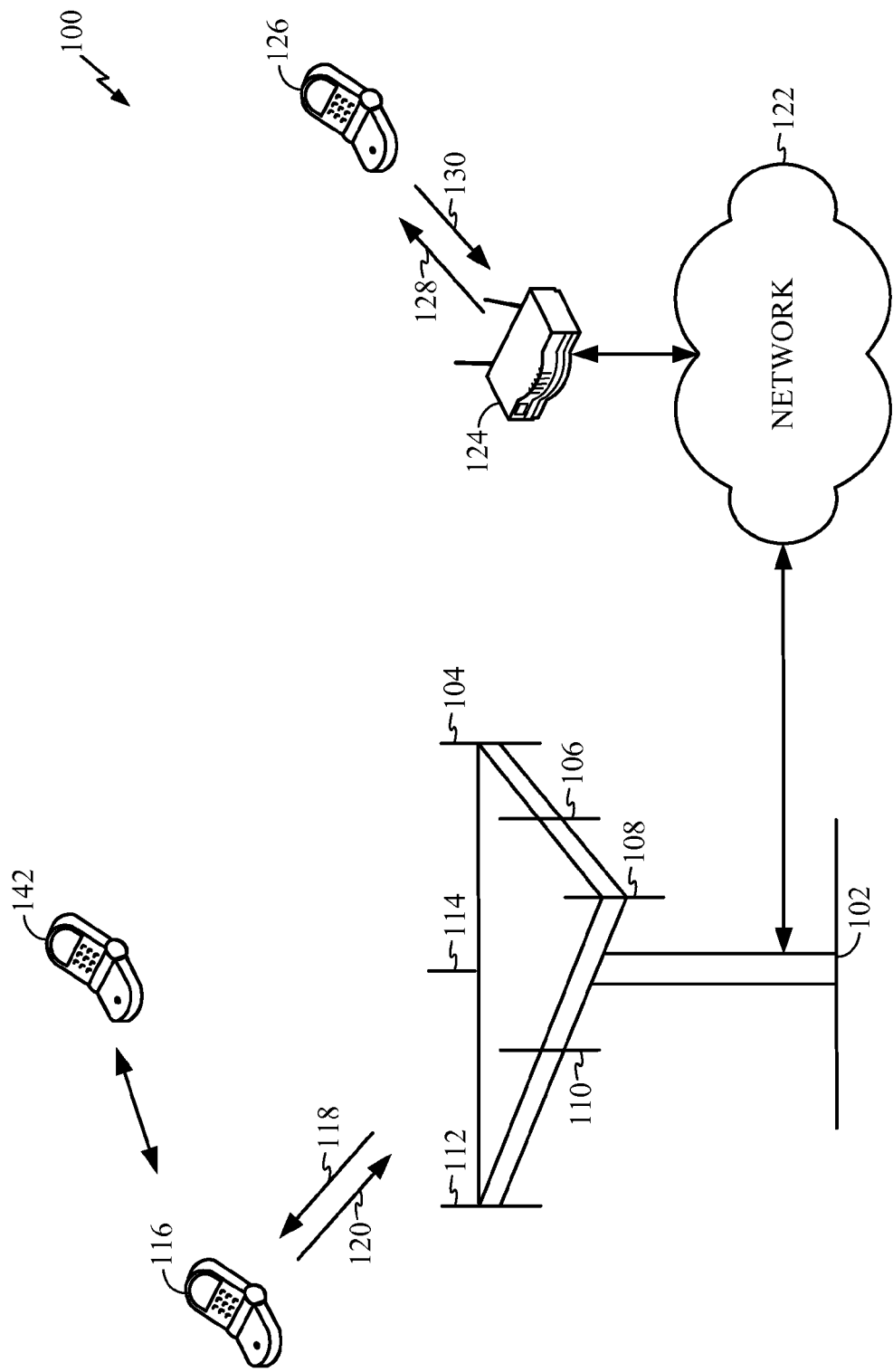
FIG. 1 illustrates a multiple access wireless communication system according to one embodiment.

In the following description, for purposes of explanation, numerous specific details are set forth in-order to provide a thorough understanding of one or more embodiments. It may be evident, however, that such embodiment(s) can be practiced without these specific details. In other instances, well-known structures and devices are shown in block diagram form in-order to facilitate describing one or more embodiments.

As used in this application, the terms "component," "module," and "system" are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a UE. A UE can also be called a mobile device, system, subscriber unit, subscriber station, mobile station, mobile, remote station, remote terminal, access terminal, user terminal, terminal, wireless communication device, user agent, user device, or device. Various embodiments are described herein in connection with a base station. A BS can be utilized for communicating with UEs and can also be referred to as an access point, Node B, evolved Node B (eNodeB or eNB), base transceiver station (BTS), or some other terminology.

Moreover, various aspects or features described herein can be implemented as a method, apparatus, or article of manufacture using standard programming and/or engineering techniques. The term "article of manufacture" as used herein is intended to encompass a computer program accessible from any machine-readable device, carrier, or media. Machine-readable media can include but are not limited to magnetic storage devices (e.g., hard disk, floppy disk, magnetic strips), optical disks (e.g., compact disk (CD), digital versatile disk (DVD)), smart cards, flash memory devices (e.g., EPROM, card, stick, key drive), random access memory (RAM), a read only memory (ROM), a programmable ROM (PROM), an erasable PROM (EPROM), registers, a removable disk, a carrier wave, a transmission line, any other suitable storage device, or any other apparatus or means through which the instructions may be transmitted.

The techniques described herein may apply to DL, UL, or both. Furthermore, the techniques described herein may be used for various wireless communication systems such as CDMA, TDMA, FDMA, OFDMA, and SC-FDMA. The terms "system" and "network" are often used interchangeably. A CDMA system may implement a radio technology such as Universal Terrestrial Radio Access (UTRA) or CDMA2000. UTRA includes Wideband-CDMA (W-CDMA) and other variants of CDMA, such as TD-SCDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, or Flash-OFDM. UTRA and E-UTRA are part of Universal Mobile Telecommunication System (UMTS). 3GPP LTE and LTE-Advanced (LTE-A) in both frequency division duplex (FDD) and time division duplex (TDD) modes are releases that use E-UTRA, which employs OFDMA on the downlink, SC-FDMA on the uplink, and multiple-input multiple-output (MIMO) antenna technology to support more users and higher data rates. UTRA, E-UTRA, UMTS, LTE and GSM are described in documents from the 3GPP organization. CDMA2000 and UMB are described in documents from the 3rd Generation Partnership Project 2 (3GPP2) organization.

Referring now to FIG. 1, a wireless communication system 100 is illustrated. The system 100 includes a BS 102 that can include multiple antenna groups. For example, one antenna group can include antennas 104 and 106, another group can include antennas 108 and 110, and an additional group can include antennas 112 and 114. Two antennas are illustrated for each antenna group. However, more or fewer antennas can be utilized for each group. The BS 102 can additionally include a transmitter chain and a receiver chain, each of which can in turn include a plurality of components associated with signal transmission and reception (e.g., processors, modulators, multiplexers, demodulators, demultiplexers, antennas), as will be appreciated by one skilled in the art.

The BS 102 can communicate with one or more UEs such as the UE 116 and the UE 126. However, it is to be appreciated that the BS 102 can communicate with substantially any number of UEs similar to the UEs 116 and 126. The UEs 116 and 126 can be, for example, cellular phones, smart phones, laptops, handheld communication devices, handheld computing devices, satellite radios, global positioning systems, PDAs, and/or any other suitable device for communicating over wireless communication system 100. As depicted, the UE 116 is in communication with the antennas 112 and 114. The antennas 112 and 114 transmit information to the UE 116 over a forward link 118 and receive information from the UE 116 over a reverse link 120. In a frequency division duplex (FDD) system, the forward link 118 can utilize a different frequency band than that used by the reverse link 120, for example. Further, in a time division duplex (TDD) system, the forward link 118 and the reverse link 120 can utilize a common frequency.

Each group of antennas and/or the area in which they are designated to communicate can be referred to as a sector of the BS 102. For example, antenna groups can be designed to communicate to UEs in a sector of the areas covered by the BS 102. In communication over the forward link 118, the transmitting antennas of the BS 102 can utilize beamforming to improve the signal-to-noise ratio (SNR) of the forward link 118 for the UE 116. While the BS 102 utilizes beamforming to transmit to the UE 116 scattered randomly through an associated coverage, UEs in neighboring cells can be subject to less interference as compared to a BS transmitting through a single antenna to all the UEs with which the BS is communicating. The UEs 116 and 126 can also communicate directly with one another using a peer-to-peer or ad hoc technology.

As shown in FIG. 1, the BS 102 can communicate with a network 122, such as a service provider's network, over a backhaul link connection. A femtocell 124 can be provided to facilitate communication with the UE 126 over the forward link 128 and the reverse link 130 (similarly to the forward link 118 and the reverse link 120, as described supra). The femtocell 124 can provide access to one or more UEs 126 much like the BS 102, but on a smaller scale. The femtocell 124 can be configured in a residence, business, and/or other close range setting. The femtocell 124 can connect to the network 122 utilizing a backhaul link connection, which can be over a broadband Internet connection (e.g., T1/T3, digital subscriber line (DSL), cable).

Figure 2:
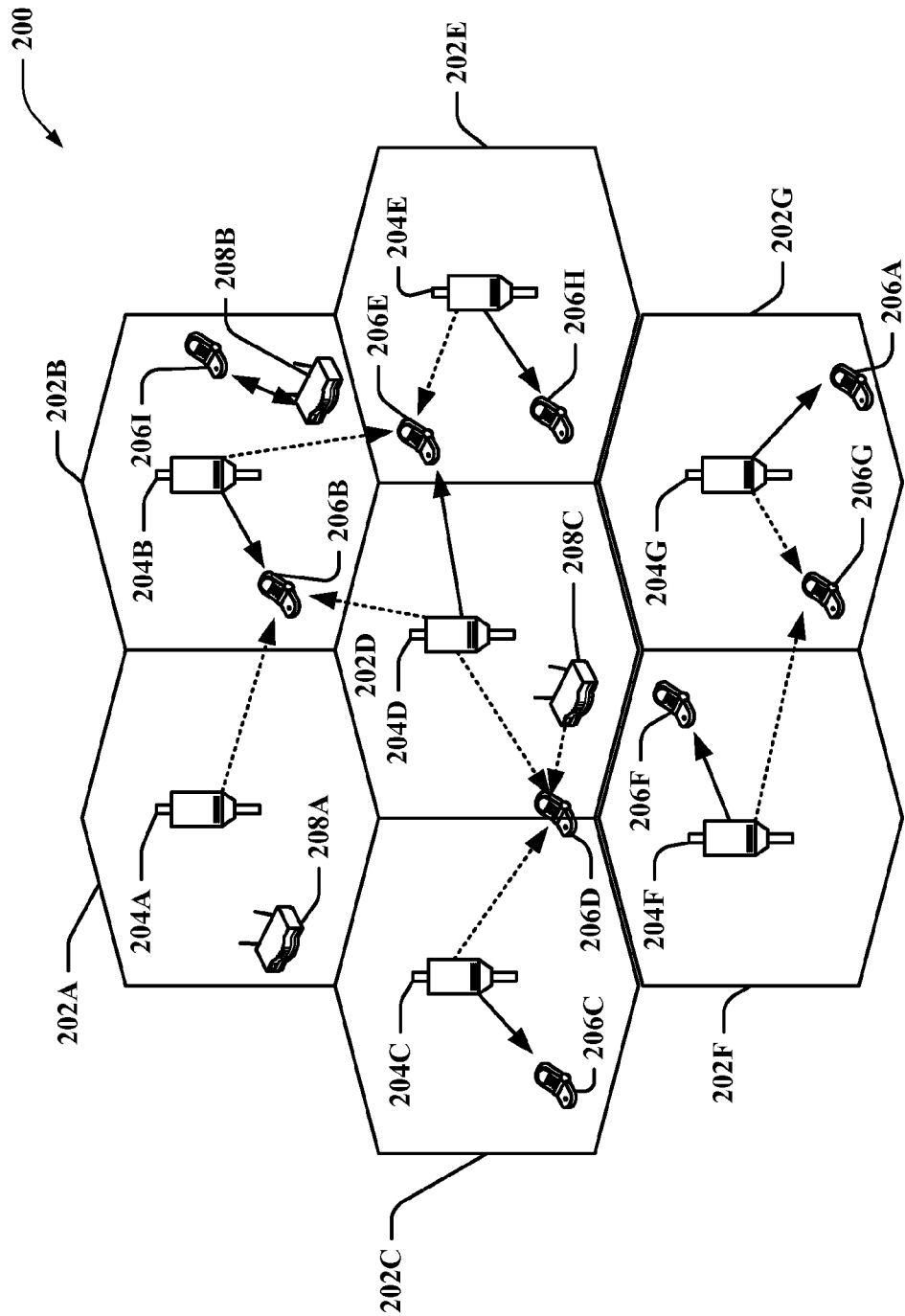
FIG. 2 is an illustration of a wireless communication network.

FIG. 2 is an illustration of a wireless communication network 200 configured to support a number of UEs. The system 200 provides communication for multiple cells, such as for example, macrocells 202A-202G, with each cell being serviced by corresponding BSs 204A-204G. The UEs 206A-206I are shown dispersed at various locations throughout the wireless communication system 200. Each UE 206A-206I can communicate with one or more BSs 204A-204G on a forward link and/or a reverse link, as described. In addition, the femtocells 208A-208C are shown. The UEs 206A-206I can additionally communicate with the femtocells 208A-208C. The wireless communication system 200 can provide service over a large geographic region, with the macrocells 202A-202G covering a broad area and the femtocells 208A-208C providing service in areas such as residences and office buildings. The UEs 206A-206I can establish connection with the BSs 204A-204G and/or the femtocells 208A-208C over the air and/or over a backhaul connection.

Figure 3:
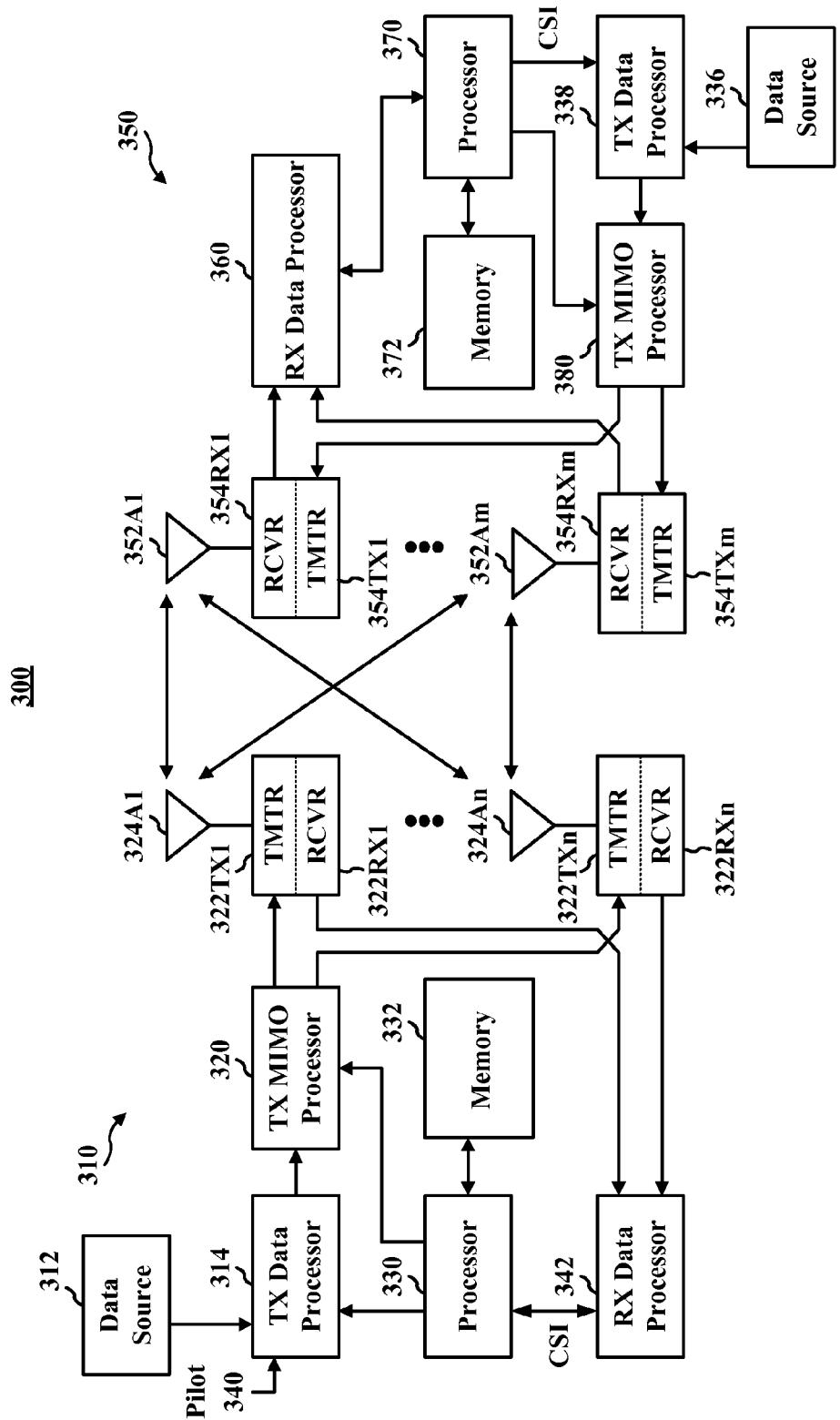
FIG. 3 is a block diagram of a wireless communication system.

FIG. 3 is a block diagram of a wireless communication system 300. The wireless communication system 300 depicts block diagrams for a BS 310 in communication with a UE 350. At BS 310, traffic data for a number of data streams is provided from a data source 312 to a transmit (TX) data processor 314. The TX data processor 314 formats, codes, and interleaves the traffic data stream based on a particular coding scheme selected for that data stream to provide coded data.

The TX data processor 314 may multiplex the coded data for each data stream with pilot data 340 using orthogonal frequency division multiplexing (OFDM) techniques. Additionally or alternatively, the pilot symbols can be frequency division multiplexed (FDM), time division multiplexed (TDM), or code division multiplexed (CDM). The pilot data 340 is typically a known data pattern that is processed in a known manner and can be used at the UE 350 to estimate the channel response. The TX data processor 314 can modulate the multiplexed pilot and coded data for each data stream based on a particular modulation scheme (e.g., binary phase-shift keying (BPSK), quadrature phase-shift keying (QPSK), M-phase-shift keying (M-PSK), M-quadrature amplitude modulation (M-QAM)) selected for that data stream to provide modulation symbols. The data rate, coding, and modulation for each data stream can be determined by instructions performed or provided by the processor 330.

In a BS 310 supporting MIMO communications, the modulation symbols for the data streams can be provided to a TX MIMO processor 320, which provides spatial processing for the modulation symbols (e.g., for OFDM). The TX MIMO processor 320 then provides n modulation symbol streams (or spatial streams) to n transmitters (TMTR) 322TX1 through 322TXn.

Each transmitter 322TX receives and processes a respective symbol stream to provide one or more analog signals, and further conditions (e.g., amplifies, filters, and upconverts) the analog signals to provide a modulated signal suitable for transmission over the MIMO channel. Further, n modulated signals from the transmitters 322TX are transmitted from n antennas 324A1 through 324An, respectively.

At the UE 350, the transmitted modulated signals are received by the m antennas 352A1 through 352Am and the received signal from each antenna 352 is provided to a respective receiver (RCVR) 354RX1 through 354RXm. Each receiver 354RX conditions (e.g., filters, amplifies, and downconverts) a respective signal, digitizes the conditioned signal to provide samples, and further processes the samples to provide a corresponding "received" symbol stream.

An RX data processor 360 can receive and process the m received symbol streams from m receivers 354 based on a particular receiver processing technique to provide n "detected" symbol streams. RX data processor 360 can demodulate, deinterleave, and decode each detected symbol stream to recover the traffic data for the data stream. The processing by RX data processor 360 is complementary to that performed by TX MIMO processor 320 and TX data processor 314 at the BS 310.

The processor 370 can formulate a reverse link message. The reverse link message can include various types of information regarding the communication link and/or the received data stream. The reverse link message is processed and modulated by a TX data processor 338, which also receives traffic data for a number of data streams from a data source 336, and further processed by the TX MIMO processor 380, conditioned by transmitters 354TX, and transmitted back to the BS 310.

The channel response estimate generated by the RX data processor 360 can be used to perform space, space/time processing at the receiver, adjust power levels, change modulation rates or schemes, or other actions. The RX data processor 360 can further estimate the signal-to-noise-and-interference ratios (SNRs) of the detected symbol streams, and possibly other channel characteristics, and provides these quantities to the processor 370. The RX data processor 360 or the processor 370 can further derive an estimate of the "operating" SNR for the system. The processor 370 then provides channel state information (CSI), which can comprise various types of information regarding the communication link and/or the received data stream. For example, the CSI can comprise only the operating SNR. In other embodiments, the CSI can comprise a channel quality indicator (CQI), which can be a numerical value indicative of one or more channel conditions. The CSI is then processed by the TX data processor 338, spatially processed by the TX MIMO processor 380, conditioned by transmitters 354TX1 through 354TXm, and transmitted back to the BS 310.

At the BS 310, the modulated signals from the UE 350 are received by the antennas 324, conditioned by the receivers 322RX, and demodulated and processed by a RX data processor 342 to extract the reverse link message transmitted by the UE 350.

The processors 330 and 370 can direct (e.g., control, coordinate, manage) operation at the BS 310 and the UE 350, respectively. The respective processors 330 and 370 can be associated with a memory 332 and 372 that store program codes and data. The processors 330 and 370 can also perform computations to derive frequency and impulse response estimates for the uplink and downlink, respectively.

Figure 4:
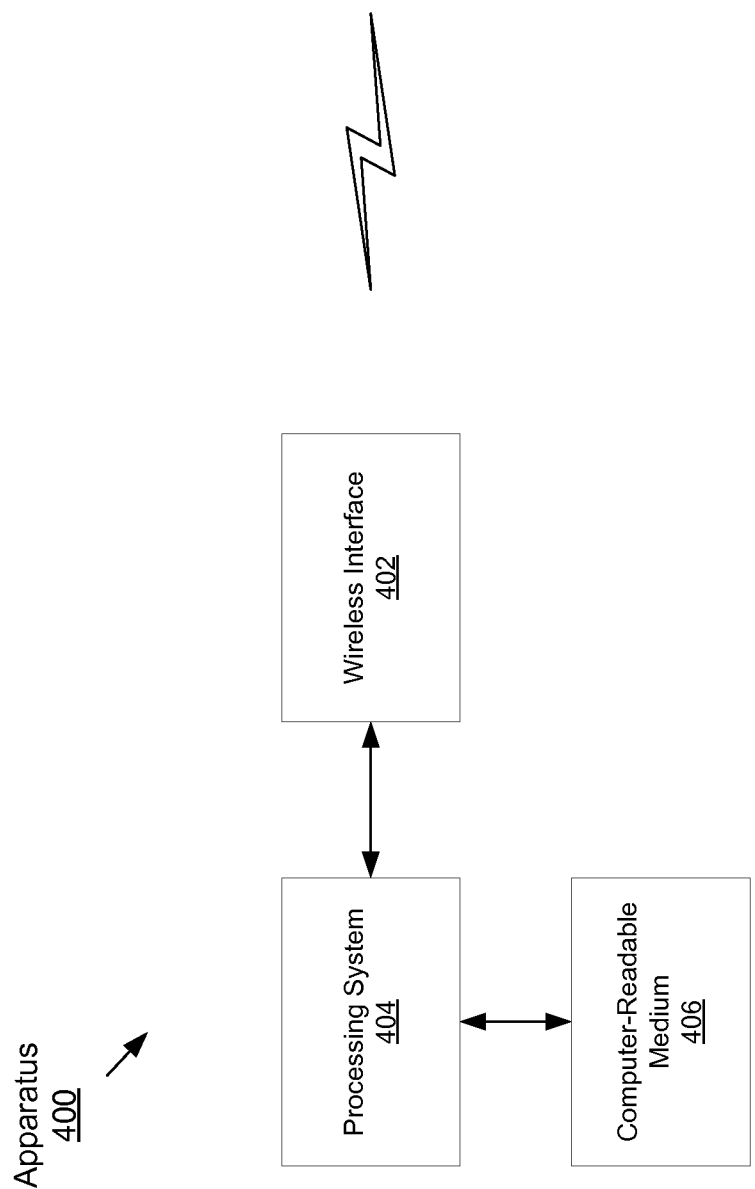
FIG. 4 is a block diagram illustrating a configuration for an apparatus.

FIG. 4 is a conceptual block diagram illustrating a hardware configuration for an exemplary apparatus. The apparatus 400 may include a wireless interface 402, a computer-readable medium 406, and a processing system 404 coupled to the wireless interface 402 and the computer-readable medium 406.

The wireless interface 402 may include a transceiver having a transmitter and receiver function to support two-way communications over the wireless medium. Alternatively, the wireless interface 402 may be configured as a transmitter or receiver to support one-way communications. The wireless interface 402 is shown as a separate entity. However, as those skilled in the art will readily appreciate, the wireless interface 402, or any portion thereof, may be integrated into the processing system 404, or distributed across multiple entities within the apparatus 400.

The processing system 404 may include one or more processors. The one or more processors may be implemented with any combination of general-purpose microprocessors, microcontrollers, a Digital Signal Processors (DSP), Field Programmable Gate Arrays (FPGA), Programmable Logic Devices (PLD), controllers, state machines, gated logic, discrete hardware components, or any other suitable entities that can perform calculations or other manipulations of information.

The computer-readable medium 406 includes code for performing functions of the processing system 404. That is, the computer-readable medium 406 stores software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 404 to perform the various functions described below, as well as other protocol processing functions.

The computer-readable medium 406 is shown as a separate entity. However, as those skilled in the art will readily appreciate, the computer-readable medium 406, or any portion thereof, may be integrated into the processing system 404. As such, the processing system 404 may include the computer-readable medium 406 for storing software. Alternatively, the computer-readable medium 406 may be distributed across multiple entities within the apparatus 400.

In one configuration, the apparatus 400 may be a computer program product and include the computer-readable medium 406. The computer-readable medium 406 may be a storage external to the processing system 404, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. The computer-readable medium 406 may also be referred to as machine-readable media. Machine-readable media may include a transmission line or a carrier wave that encodes a data signal. Those skilled in the art will recognize how best to implement the described functionality for the processing system.

Figure 5:
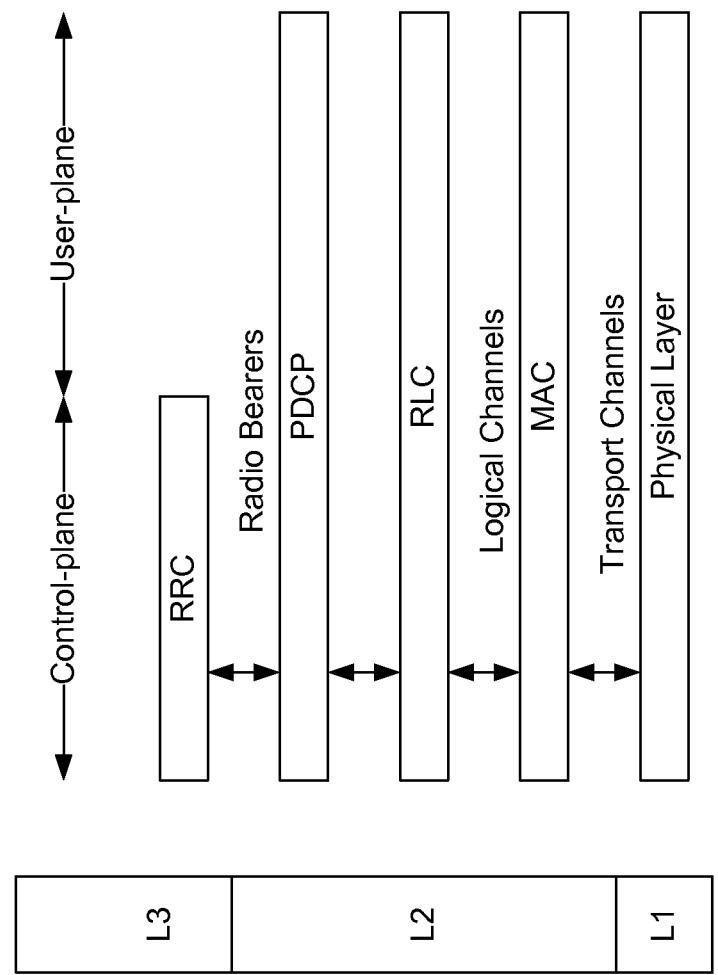
FIG. 5 is a diagram illustrating the protocol architecture in LTE.

FIG. 5 is a diagram 500 illustrating the protocol architecture in LTE. The physical layer carries the transport channels provided by the MAC layer. The transport channels describe how and with what characteristics data are carried on the radio interface on the physical channels. The MAC layer offers the logical channels (LCs) to the radio link control (RLC) layer. The LCs characterize the type of data to be transmitted. Above the RLC layer in Layer 2 (L2) is the packet data convergence protocol (PDCP) layer.

Figure 6:
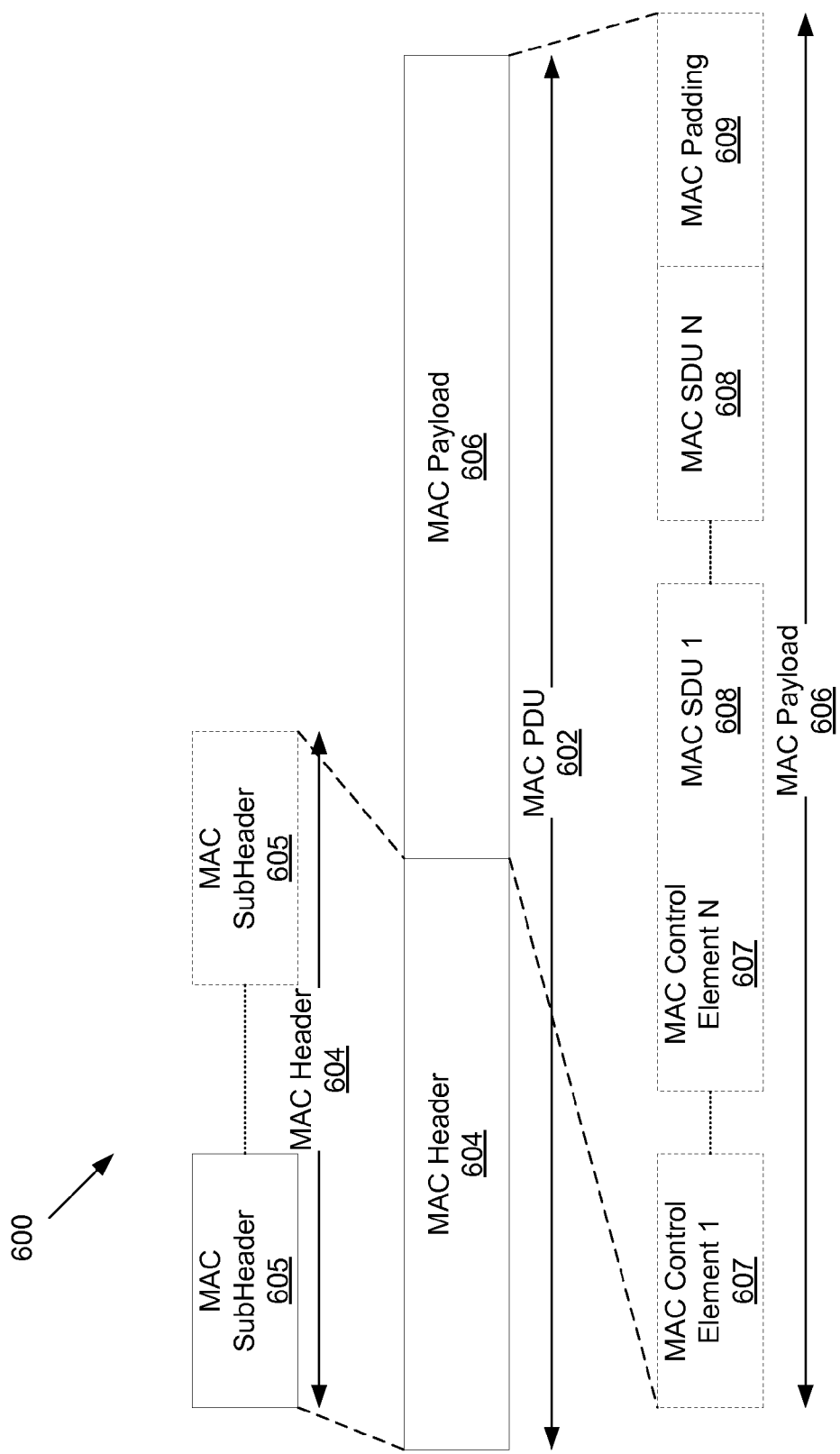
FIG. 6 is a diagram illustrating a MAC PDU.

FIG. 6 is a diagram 600 illustrating a MAC PDU 602. The MAC PDU 602 includes a MAC header 604 and a MAC payload 606. The MAC header is further composed of MAC subheaders 605. The MAC payload 606 is composed of MAC control elements 607, MAC service data units (SDUs) 608 (payload data), and MAC padding 609. The MAC subheaders 605 each include a logical channel identification (LCID) and a length field. The LCID indicates whether the corresponding part of the MAC payload 606 is a MAC control element 607, and if not, to which logical channel the related MAC SDU 608 belongs. The length field indicates the size of the related MAC SDU 608 or MAC control element 607. MAC control elements 607 are used for delivery of the buffer status report (BSR) information.

Figure 7:
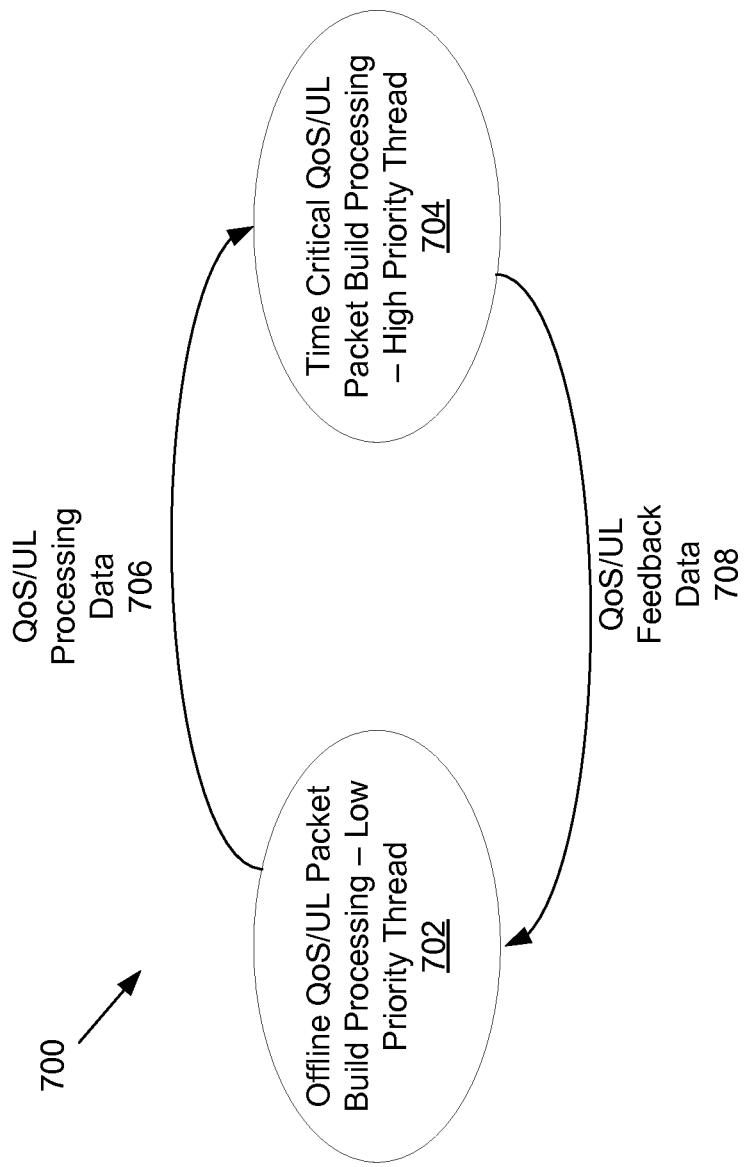
FIG. 7 is a diagram illustrating an exemplary process of building the MAC PDU with two threads.
Figure 8:
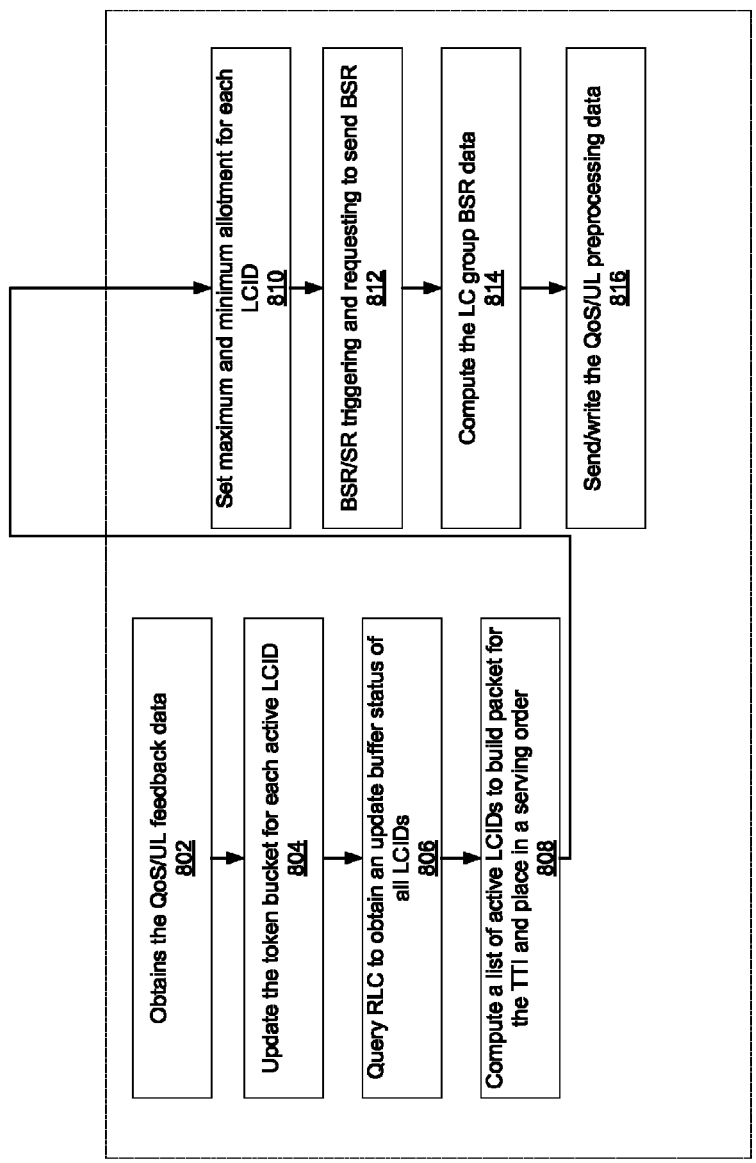
FIG. 8 is a diagram illustrating the functions of the low priority thread.
Figure 9:
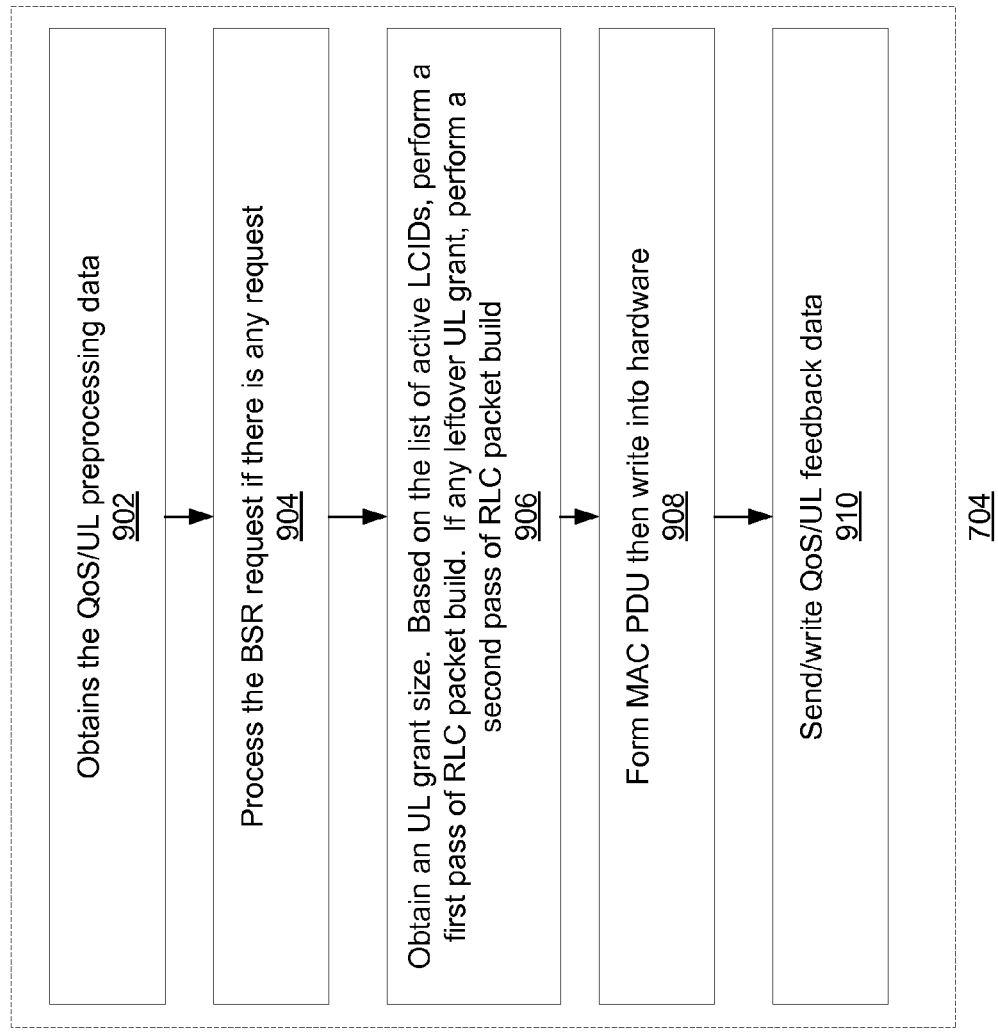
FIG. 9 is a diagram illustrating the functions of the high priority thread.

FIG. 7 is a diagram 700 illustrating an exemplary process of building the MAC PDU 602 with two threads. FIG. 8 is a diagram illustrating the functions of the low priority thread 702. FIG. 9 is a diagram illustrating the functions of the high priority thread 704. As shown in FIG. 7, the exemplary UE QoS/UL packet build process includes two threads, a low priority thread 702 for handling offline QoS/UL packet build processing and a high priority thread 704 for handling time critical QoS/UL packet build processing. As shown in FIG. 8, for each TTI, the low priority thread 702 may perform the following functions: (1) obtain the QoS/UL feedback data 708 from the high priority thread 704 (802), (2) update a token bucket for each active LCID (804), (3) query the RLC layer to get an update buffer status of all LCIDs (806), (4) compute a list of active LCIDs to build a packet for the TTI and place in a serving order (808), (5) set a maximum and minimum allotment for each LCID (810), (6) handle BSR/scheduling request (SR) triggering and requesting to send the BSR (812), (7) compute the LC group BSR report data (814), and (8) send the QoS/UL preprocessing data 706 to the high priority thread 704 (816). The low priority thread 702 may perform additional "low priority" functions in order to enable the high priority thread 704 to form the MAC PDU more efficiently. As shown in FIG. 9, when requested by the physical layer, the high priority thread 704 performs the following functions: (1) obtains the QoS/UL preprocessing data 706 from the low priority thread 702 (902), (2) processes the BSR request if there is any request (904), (3) performs first and second passes for the RLC packet build (906), (4) forms the MAC PDU and writes into hardware (908), and (5) sends QoS/UL feedback data 708 to the low priority thread 702 (910).

Referring now to FIG. 8, the low priority thread 702 obtains the QoS/UL feedback data 708 from the high priority thread 704 (802). The QoS/UL feedback data 708 includes information on the amount of data sent in UL for each active LCID. In LTE, there are 32 LCIDs, each of which map to a different application. Every TTI, the low priority thread 702 updates a token bucket for each LCID (804). In addition, when the low priority thread 702 receives the QoS/UL feedback data 708, the low priority thread 702 further updates the token bucket for each LCID (804). The low priority thread 702 initializes each token bucket to zero. Every TTI, the low priority thread 702 adds a count equal to the prioritized bit rate (PBR) for the respective LCID to the token bucket for the corresponding LCID. The count of each of the token buckets is limited to a predetermined maximum. As such, when the count of a token bucket reaches the predetermined maximum, the low priority thread 702 discontinues adding a count to the token bucket until the count is less than the predetermined maximum. When the low priority thread 702 receives QoS/UL feedback data 708, the low priority thread 702 subtracts from each of the active token buckets a count equal to the amount of data sent in UL for each active LCID. Because more data can be sent in UL than the PBR, the count for a token bucket may at times be negative. As such, each of the token buckets indicates how much data is owed for a particular LCID in order to meet the PBR for the particular LCID.

The low priority thread 702 queries the RLC to obtain an update buffer status of all LCIDs (806). The buffer status is the amount of data in the RLC for UL for each of the LCIDs. After the low priority thread 702 obtains the updated buffer status for the LCIDs, the low priority thread 702 computes a list of active LCIDs to build the packet (808). The low priority thread 702 places the active LCIDs in the list in order of their priority level, with the active LCID with the highest priority level listed first. Alternatively, the active LCIDs may be placed in order based on their priority level, PBR, and accumulated used size. For each LCID in the list, the low priority thread 702 computes a maximum and a minimum allotment. The minimum allotment is a function of the token bucket size and the buffer size in the RLC. In one configuration, the minimum allotment is equal to the minimum of the buffer size in the RLC and the token bucket size, but is not less than zero. For example, if $LCID_n$ is in the list of active LCIDs and the buffer size for $LCID_n$ is 300 and the token bucket size for $LCID_n$ is 400, then the minimum allotment for $LCID_n$ would be set to 300. However, if the buffer size for $LCID_n$ is 300 and the token bucket size for $LCID_n$ is −400, then the minimum allotment for $LCID_n$ would be set to 0. In the low priority thread 702, the maximum allotment is set to the minimum allotment, as the low priority thread 702 does not know the size of the UL grant.

The low priority thread 702 determines that the buffer status report (BSR) has been triggered (e.g., upon expiration of a timer or upon determining that high priority data is in the RLC for UL) and requests the high priority thread 704 to send the BSR (812). The BSR includes the amount of data in the RLC for the LCIDs. The low priority thread 702 also determines whether a scheduling request (SR) should be sent to the BS (812). The SR lets the BS know that the UE needs an UL grant. The low priority thread 702 triggers the SR to be sent to the BS by interfacing with the physical layer.

The low priority thread 702 computes the LC group BSR data (814). The BSR includes a buffer size for up to four different groups, each of the groups being associated with a different LC group. Which LCIDs are in which LC group is determined by the BS. Each of the active LCIDs map to one of the LC groups. The low priority thread 702 computes the total buffer size for each LC group by summing the RLC buffer size for each of the active LCIDs in the respective LC group.

The low priority thread 702 sends the QoS/UL preprocessing data 706 to the high priority thread 704 (816). Rather than send the QoS/UL preprocessing data 706, the low priority thread 702 may write and update a memory location to which the high priority thread 704 has access (816). The QoS/UL preprocessing data 706 includes the list of active LCIDs for building a packet for the particular TTI, the maximum and minimum allotments, a BSR request or nonrequest, and the LC group BSR data. The QoS/UL preprocessing data 706 may include addition information to facilitate the high priority thread 704. As discussed supra, the low priority thread 702 may perform additional "low priority" functions in order to enable the high priority thread 704 to form the MAC PDU more efficiently.

Referring now to FIG. 9, when the high priority thread 704 is requested to build an UL packet, the high priority thread 704 obtains the QoS/UL preprocessing data 706 (902). If the low priority thread 702 requested the BSR be sent, the high priority thread 704 then processes the BSR request (904) and allocates space (between two and four bytes) for the LC group BSR data. Based on the list of active LCIDs, the high priority thread 704 performs a first pass of the RLC packet build (906). To perform the first pass of the RLC packet build, the high priority thread 704 updates the maximum and minimum allotments set by the low priority thread 702. When the high priority thread 704 is requested to build the UL packet, the high priority thread 704 receives the UL grant size. For the first active LCID (i.e., the LCID with the highest priority level), the high priority thread 704 sets the maximum allotment to the UL grant size, and if the UL grant size is less than the minimum allotment, the high priority thread 704 also sets the minimum allotment to the UL grant size. For the remaining active LCIDs, the high priority thread 704 sets the maximum allotment to the remaining UL grant size, and if the remaining UL grant size is less than the minimum allotment, the high priority thread 704 also sets the minimum allotment to the remaining UL grant size. After adjusting the maximum allotment, and if needed, the minimum allotment, for an active LCID, the high priority thread 704 requests the RLC layer to build the packet for the LCID. The high priority thread 704 starts with the first LCID in the list of active LCIDs and requests the RLC layer to build the packet using a data size between the minimum and maximum allotments. The RLC layer will then choose a data size for the particular LCID for the packet. The data size may or may not be within the minimum to maximum allotment range.

After performing the first pass, if there is any space left for the UL grant, the high priority thread 704 again adjusts the minimum and maximum allotments, and performs a second pass of the RLC packet build. In this case, the high priority thread 704 adjusts the maximum allotment to the remaining UL grant size and adjusts the minimum allotment to equal the maximum allotment.

Subsequently, the high priority thread 704 forms the MAC PDU and then writes the MAC PDU to hardware (908). The high priority thread 704 then sends/writes the QoS/UL feedback data 708, thus providing the QoS/UL feedback data 708 to the low priority thread 702. Through the exemplary method with respect to the setting of the minimum and maximum allotments in the low priority thread 702 and the high priority thread 704, the exemplary apparatus 400 achieves the PBR for each of the LCIDs and avoids data segmentation in the RLC layer. In addition, data provided by the low priority thread 702 enables the high priority thread 704 to construct a packet more efficiently. Furthermore, the first pass and the second pass RLC packet build of the high priority thread 704 simplifies the process of building a packet. Accordingly, the exemplary apparatus/method improves and optimizes the UE QoS/UL packet build to reduce the burden on the CPU of the UE.

An example best demonstrates the first and second pass RLC packet build with the setting of the minimum and maximum allotments. Assume that there are two active LCIDs, $LCID_0$ and $LCID_1$, and that $LCID_0$ has the highest priority. Assume also that each of $LCID_0$ and $LCID_1$ have an initial setting of 100 bytes for the minimum and maximum allotments (which is set by the low priority thread 702). If the UL grant is 500 bytes, then the high priority thread 704 will set the maximum allotment for $LCID_0$ to 500 bytes, and will request an RLC packet build for $LCID_0$ with a minimum allotment of 100 bytes and a maximum allotment of 500 bytes. If the RLC layer builds the packet for $LCID_0$ using 200 bytes, then the remaining UL grant size is 300 bytes. Accordingly, the high priority thread 704 will set the maximum allotment for $LCID_1$ to 300 bytes, and will request an RLC packet build for $LCID_1$ with a minimum allotment of 100 bytes and a maximum allotment of 300 bytes. If the RLC layer builds the packet for $LCID_1$ using 150 bytes, then the remaining UL grant size is 150 bytes. Accordingly, on the second pass, for $LCID_0$, the high priority thread 704 will set the maximum allotment to 150 bytes and the minimum allotment to 150 bytes, and will request an RLC packet build for $LCID_0$ with a minimum allotment of 150 bytes and a maximum allotment of 150 bytes. If the RLC layer builds the packet for $LCID_0$ with 50 bytes, then the remaining UL grant size is 100 bytes. For $LCID_1$, the high priority thread 704 will then set the maximum allotment to 100 bytes and the minimum allotment to 100 bytes, and will request an RLC packet build for $LCID_1$ with a minimum allotment of 100 bytes and a maximum allotment of 100 bytes. If the RLC layer builds the packet for $LCID_1$ with 50 bytes, then the remaining UL grant size is 50 bytes. The high priority thread 704 may then add 50 bytes of padding, or alternatively, may build the BSR (even if not originally requested by the low priority thread 702) to fill two to four bytes, and will pad what remains.

Figure 10:
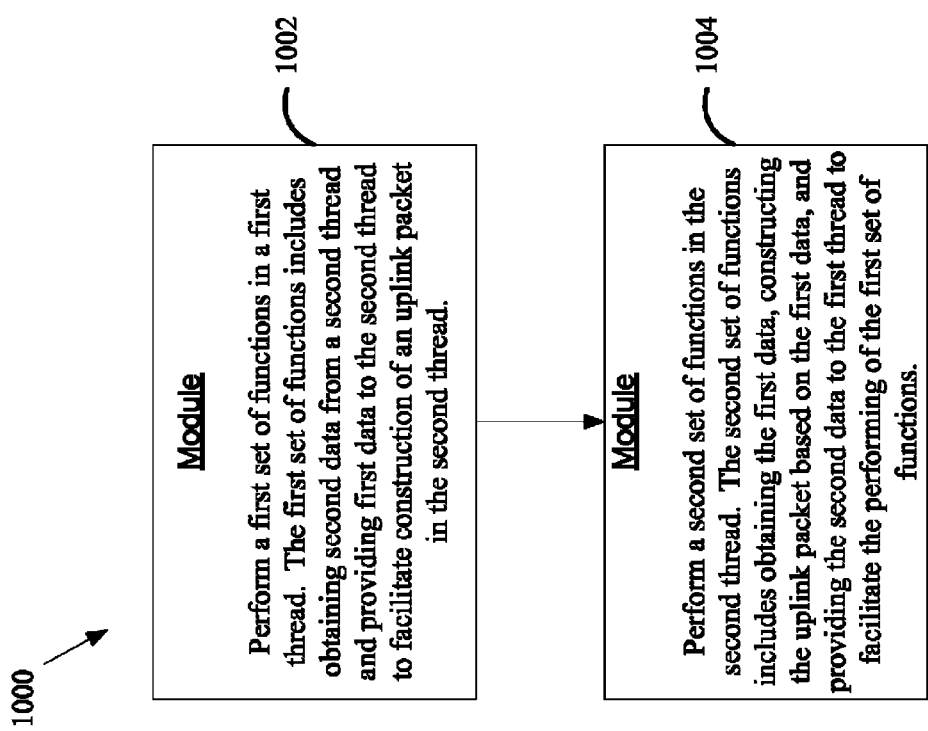
FIG. 10 is a block diagram illustrating the functionality of an exemplary apparatus.

FIG. 10 is a conceptual block diagram 1000 illustrating the functionality of an exemplary UE apparatus 400. The apparatus 400 includes a module that performs a first set of functions in a first thread (i.e., low priority thread 702). The first set of functions includes obtaining second data from a second thread (i.e., high priority thread 704) and providing first data to the second thread to facilitate construction of an UL packet in the second thread. The apparatus 400 further includes a module that performs a second set of functions in the second thread. The second set of functions includes obtaining the first data, constructing the UL packet based on the first data, and providing the second data to the first thread to facilitate the performing of the first set of functions. In one configuration, the first set of functions is performed in a relaxed timing deadline for aiding the second set of functions. In such a configuration, the first set of functions includes updating token buckets for LCIDs; querying the RLC layer to obtain a buffer status for each of the LCIDs; computing a serving order of active LCIDs of the LCIDs; determining whether to send a buffer status report to a base station; triggering, when needed, a status report to be sent to the base station; and computing logical channel group buffer status report data. The first data include the serving order, information related to whether to send the buffer status report, and the logical channel group buffer status report data. In one configuration, the first set of functions includes computing a minimum allotment and a maximum allotment for active LCIDs, and the first data include the minimum allotment and the maximum allotment for each of the active LCIDs. In one configuration, the computing the minimum allotment and the maximum allotment for an active LCID of the active LCIDs includes setting the minimum allotment to a minimum of a token bucket size for the active LCID and a buffer size in a RLC layer for the active LCID when the token bucket size and the buffer size are greater than zero; setting the minimum allotment to zero when the token bucket size or the buffer size is less than zero; and setting the maximum allotment equal to the minimum allotment.

In one configuration, the second set of functions is performed in a strict timing deadline upon receiving an uplink packet build request from a physical layer. The second set of functions includes processing a MAC element trigger. The MAC element trigger includes a BSR trigger from the low priority thread 702 and/or a power headroom report from the physical layer. In one configuration, the second set of functions includes obtaining an UL grant size and performing a first pass of a packet build in a RLC layer and a second pass of the packet build in the RLC layer for active LCIDs. In one configuration, the first pass and the second pass for an active LCID of the active LCIDs include adjusting a minimum allotment and a maximum allotment for the active LCID; requesting the RLC layer to build a packet for the active LCID based on the minimum allotment and the maximum allotment; and adjusting a remaining UL grant size of the UL grant size based on a size of a packet built in the RLC layer for the active LCID. In one configuration, the adjusting the minimum allotment and the maximum allotment for the active LCID in the first pass includes setting the maximum allotment to the remaining UL grant size, and setting the minimum allotment to the remaining UL grant size when the remaining UL grant size is less than the minimum allotment. In one configuration, the adjusting the minimum allotment and the maximum allotment for the active LCID in the second pass includes setting the maximum allotment and the minimum allotment to the remaining UL grant size. In one configuration, the second set of functions includes forming a MAC PDU and submitting the MAC PDU to the physical layer. The second data include information on an amount of data sent in UL for each active LCID.

In one configuration, the apparatus 400 for wireless communication includes means for performing a first set of functions in a first thread. The first set of functions includes obtaining second data from a second thread and providing first data to the second thread to facilitate construction of an UL packet in the second thread. The apparatus 400 further includes means for performing a second set of functions in the second thread. The second set of functions includes obtaining the first data, constructing the UL packet based on the first data, and providing the second data to the first thread to facilitate the performing of the first set of functions. The aforementioned means is the processing system 404 configured to perform the functions recited by the aforementioned means.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. A claim that recites at least one of a combination of elements (e.g., "at least one of A, B, or C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
    performing a first set of functions in a first thread, the first set of functions comprising obtaining a second data from a second thread and providing first data to the second thread to facilitate construction of an uplink packet in the second thread, wherein the first set of functions comprises computing a minimum allotment and a maximum allotment for active logical channel identifications, and the first data comprise the minimum allotment and the maximum allotment for each of the active logical channel identifications; and setting the minimum allotment to zero when a token bucket size or a buffer size is less than zero; and performing a second set of functions in the second thread, the second set of functions comprising obtaining the first data, adjusting the minimum allotment and the maximum allotment for the active logical channel identification obtained from the first thread, constructing the uplink packet based on the first data, and providing the second data to the first thread to facilitate the performing of the first set of functions, wherein the first set of function is performed in a relaxed timing deadline, and the second set of functions is performed in a strict timing deadline.

2. The method of claim 1, wherein the first set of functions comprises:

updating token buckets for logical channel identifications;
querying a radio link control layer to obtain a buffer status for each of the logical channel identifications;
computing a serving order of active logical channel identifications of the logical channel identifications;
determining whether to send a buffer status report to a base station;
triggering, when needed, a status report to be sent to the base station; and
computing logical channel group buffer status report data, wherein the first data comprise the serving order, information related to whether to send the buffer status report, and the logical channel group buffer status report data.

3. The method of claim 1, wherein the computing the minimum allotment and the maximum allotment for an active logical channel identification of the active logical channel identifications comprises:

setting the minimum allotment to a minimum of a token bucket size for the active logical channel identification and a buffer size in a radio link control layer for the active logical channel identification when the token bucket size and the buffer size are greater than zero;
setting the maximum allotment equal to the minimum allotment.

4. The method of claim 1, wherein the second set of functions comprises processing a medium access control element trigger.

5. The method of claim 1, wherein the second set of functions comprises obtaining an uplink grant size and performing a first pass of a packet build in a radio link control layer and a second pass of the packet build in the radio link control layer for active logical channel identifications.

6. The method of claim 5, wherein the adjusting the minimum allotment and a maximum allotment is performed in the first pass and the second pass, and the first pass and the second pass for an active logical channel identification of the active logical channel identifications further comprise:

providing the minimum allotment and the maximum allotment to the radio link control layer;
requesting the radio link control layer to build a packet for the active logical channel identification with a packet size based on the minimum allotment and the maximum allotment; and adjusting a remaining uplink grant size of the uplink grant size based on the packet size of the packet built in the radio link control layer for the active logical channel identification.

7. The method of claim 6, wherein the adjusting the minimum allotment and the maximum allotment for the active logical channel identification in the first pass comprises:

setting the maximum allotment to the remaining uplink grant size; and
setting the minimum allotment to the remaining uplink grant size when the remaining uplink grant size is less than the minimum allotment.

8. The method of claim 6, wherein the adjusting the minimum allotment and the maximum allotment for the active logical channel identification in the second pass comprises setting the maximum allotment and the minimum allotment to the remaining uplink grant size.

9. The method of claim 6, further comprising selecting, by the radio link control layer, the packet size between the minimum allotment and the maximum allotment in order to reduce packet segmentation.

10. The method of claim 6, wherein the minimum allotment and the maximum allotment provided to the radio link control layer for the active logical channel identification ensure that a priority bit rate is satisfied for the active logical channel identification.

11. The method of claim 1, wherein the second set of functions comprises forming a medium access control packet data unit and submitting the medium access control packet data unit to a physical layer, wherein the second data comprise information on an amount of data sent in uplink for each active logical channel identification.

12. An apparatus for wireless communication, comprising:
a processing system configured to:
perform a first set of functions in a first thread, the first set of functions comprising obtaining a second data from a second thread and providing first data to the second thread to facilitate construction of an uplink packet in the second thread, wherein the first set of functions comprises computing a minimum allotment and a maximum allotment for active logical channel identifications, and the first data comprise the minimum allotment and the maximum allotment for each of the active logical channel identifications; and set the minimum allotment to zero when a token bucket size or a buffer size is less than zero; and perform a second set of functions in the second thread, the second set of functions comprising obtaining the first data, adjusting the minimum allotment and the maximum allotment for the active logical channel identification obtained from the first thread, constructing the uplink packet based on the first data, and providing the second data to the first thread to facilitate the performing of the first set of functions, wherein the first set of function is performed in a relaxed timing deadline, and the second set of functions is performed in a strict timing deadline.

13. The apparatus of claim 12, wherein the first set of functions comprises:

updating token buckets for logical channel identifications;
querying a radio link control layer to obtain a buffer status for each of the logical channel identifications;
computing a serving order of active logical channel identifications of the logical channel identifications;
determining whether to send a buffer status report to a base station;

triggering, when needed, a status report to be sent to the base station; and computing logical channel group buffer status report data, wherein the first data comprise the serving order, information related to whether to send the buffer status report, and the logical channel group buffer status report data.

14. The apparatus of claim 12, wherein to compute the minimum allotment and the maximum allotment for an active logical channel identification of the active logical channel identifications, the processing system is configured to:

set the minimum allotment to a minimum of a token bucket size for the active logical channel identification and a buffer size in a radio link control layer for the active logical channel identification when the token bucket size and the buffer size are greater than zero;

set the maximum allotment equal to the minimum allotment.

15. The apparatus of claim 12, wherein the second set of functions comprises processing a medium access control element trigger.

16. The apparatus of claim 12, wherein the second set of functions comprises obtaining an uplink grant size and performing a first pass of a packet build in a radio link control layer and a second pass of the packet build in the radio link control layer for active logical channel identifications.

17. The apparatus of claim 16, wherein the adjusting the minimum allotment and a maximum allotment is performed in the first pass and the second pass, and to perform the first pass and the second pass for an active logical channel identification of the active logical channel identifications, the processing system is further configured to:

provide the minimum allotment and the maximum allotment to the radio link control layer;

request the radio link control layer to build a packet for the active logical channel identification with a packet size based on the minimum allotment and the maximum allotment; and adjust a remaining uplink grant size of the uplink grant size based on the packet size of the packet built in the radio link control layer for the active logical channel identification.

18. The apparatus of claim 17, wherein to adjust the minimum allotment and the maximum allotment for the active logical channel identification in the first pass, the processing system is configured to:

set the maximum allotment to the remaining uplink grant size; and set the minimum allotment to the remaining uplink grant size when the remaining uplink grant size is less than the minimum allotment.

19. The apparatus of claim 17, wherein to adjust the minimum allotment and the maximum allotment for the active logical channel identification in the second pass, the processing system is configured to set the maximum allotment and the minimum allotment to the remaining uplink grant size.

20. The apparatus of claim 17, wherein the radio link control layer selects the packet size between the minimum allotment and the maximum allotment in order to reduce packet segmentation.

21. The apparatus of claim 17, wherein the minimum allotment and the maximum allotment provided to the radio link control layer for the active logical channel identification ensure that a priority bit rate is satisfied for the active logical channel identification.

22. The apparatus of claim 12, wherein the second set of functions comprises forming a medium access control packet data unit and submitting the medium access control packet data unit to a physical layer, wherein the second data comprise information on an amount of data sent in uplink for each active logical channel identification.

23. An apparatus for wireless communication, comprising:

means for performing a first set of functions in a first thread, the first set of functions comprising obtaining a second data from a second thread and providing first data to the second thread to facilitate construction of an uplink packet in the second thread, wherein the first set of functions comprises computing a minimum allotment and a maximum allotment for active logical channel identifications, and the first data comprise the minimum allotment and the maximum allotment for each of the active logical channel identifications; and setting the minimum allotment to zero when a token bucket size or a buffer size is less than zero; and means for performing a second set of functions in the second thread, the second set of functions comprising obtaining the first data, adjusting the minimum allotment and the maximum allotment for the active logical channel identification obtained from the first thread, constructing the uplink packet based on the first data, and providing the second data to the first thread to facilitate the performing of the first set of functions, wherein the first set of function is performed in a relaxed timing deadline, and the second set of functions is performed in a strict timing deadline.

24. The apparatus of claim 23, wherein the first set of functions comprises:

updating token buckets for logical channel identifications;

querying a radio link control layer to obtain a buffer status for each of the logical channel identifications;

computing a serving order of active logical channel identifications of the logical channel identifications;

determining whether to send a buffer status report to a base station;

triggering, when needed, a status report to be sent to the base station; and computing logical channel group buffer status report data, wherein the first data comprise the serving order, information related to whether to send the buffer status report, and the logical channel group buffer status report data.

25. The apparatus of claim 23, wherein the computing the minimum allotment and the maximum allotment for an active logical channel identification of the active logical channel identifications comprises:

setting the minimum allotment to a minimum of a token bucket size for the active logical channel identification and a buffer size in a radio link control layer for the active logical channel identification when the token bucket size and the buffer size are greater than zero;

setting the maximum allotment equal to the minimum allotment.

26. The apparatus of claim 23, wherein the second set of functions comprises processing a medium access control element trigger.

27. The apparatus of claim 23, wherein the second set of functions comprises obtaining an uplink grant size and performing a first pass of a packet build in a radio link control layer and a second pass of the packet build in the radio link control layer for active logical channel identifications.

28. The apparatus of claim 27, wherein the adjusting the minimum allotment and a maximum allotment is performed in the first pass and the second pass, and the first pass and the second pass for an active logical channel identification of the active logical channel identifications further comprise:

providing the minimum allotment and the maximum allotment to the radio link control layer;

requesting the radio link control layer to build a packet for the active logical channel identification with a packet size based on the minimum allotment and the maximum allotment; and adjusting a remaining uplink grant size of the uplink grant size based on the packet size of the packet built in the radio link control layer for the active logical channel identification.

29. The apparatus of claim 28, wherein the adjusting the minimum allotment and the maximum allotment for the active logical channel identification in the first pass comprises:

setting the maximum allotment to the remaining uplink grant size; and setting the minimum allotment to the remaining uplink grant size when the remaining uplink grant size is less than the minimum allotment.

30. The apparatus of claim 28, wherein the adjusting the minimum allotment and the maximum allotment for the active logical channel identification in the second pass comprises setting the maximum allotment and the minimum allotment to the remaining uplink grant size.

31. The apparatus of claim 28, further comprising means for selecting, by the radio link control layer, the packet size between the minimum allotment and the maximum allotment in order to reduce packet segmentation.

32. The apparatus of claim 28, wherein the minimum allotment and the maximum allotment provided to the radio link control layer for the active logical channel identification ensure that a priority bit rate is satisfied for the active logical channel identification.

33. The apparatus of claim 23, wherein the second set of functions comprises forming a medium access control packet data unit and submitting the medium access control packet data unit to a physical layer, wherein the second data comprise information on an amount of data sent in uplink for each active logical channel identification.

34. A computer program product for wireless communication, comprising:

a non-transitory computer-readable medium comprising code for:

performing a first set of functions in a first thread, the first set of functions comprising obtaining a second data from a second thread and providing first data to the second thread to facilitate construction of an uplink packet in the second thread, wherein the first set of functions comprises computing a minimum allotment and a maximum allotment for active logical channel identifications, and the first data comprise the minimum allotment and the maximum allotment for each of the active logical channel identifications; and setting the minimum allotment to zero when a token bucket size or a buffer size is less than zero; and performing a second set of functions in the second thread, the second set of functions comprising obtaining the first data, adjusting the minimum allotment and the maximum allotment for the active logical channel identification obtained from the first thread, constructing the uplink packet based on the first data, and providing the second data to the first thread to facilitate the performing of the first set of functions, wherein the first set of function is performed in a relaxed timing deadline, and the second set of functions is performed in a strict timing deadline.

35. The computer program product of claim 34, wherein the first set of functions comprises:

updating token buckets for logical channel identifications;

querying a radio link control layer to obtain a buffer status for each of the logical channel identifications;

computing a serving order of active logical channel identifications of the logical channel identifications;

determining whether to send a buffer status report to a base station;

triggering, when needed, a status report to be sent to the base station; and computing logical channel group buffer status report data, wherein the first data comprise the serving order, information related to whether to send the buffer status report, and the logical channel group buffer status report data.

36. The computer program product of claim 34, wherein the computing the minimum allotment and the maximum allotment for an active logical channel identification of the active logical channel identifications comprises:

setting the minimum allotment to a minimum of a token bucket size for the active logical channel identification and a buffer size in a radio link control layer for the active logical channel identification when the token bucket size and the buffer size are greater than zero;

setting the maximum allotment equal to the minimum allotment.

37. The computer program product of claim 34, wherein the second set of functions comprises processing a medium access control element trigger.

38. The computer program product of claim 34, wherein the second set of functions comprises obtaining an uplink grant size and performing a first pass of a packet build in a radio link control layer and a second pass of the packet build in the radio link control layer for active logical channel identifications.

39. The computer program product of claim 38, wherein the adjusting the minimum allotment and a maximum allotment is performed in the first pass and the second pass, and the first pass and the second pass for an active logical channel identification of the active logical channel identifications further comprise:

providing the minimum allotment and the maximum allotment to the radio link control layer;

requesting the radio link control layer to build a packet for the active logical channel identification with a packet size based on the minimum allotment and the maximum allotment; and adjusting a remaining uplink grant size of the uplink grant size based on the packet size of the packet built in the radio link control layer for the active logical channel identification.

40. The computer program product of claim 39, wherein the adjusting the minimum allotment and the maximum allotment for the active logical channel identification in the first pass comprises:

setting the maximum allotment to the remaining uplink grant size; and setting the minimum allotment to the remaining uplink grant size when the remaining uplink grant size is less than the minimum allotment.

41. The computer program product of claim 39, wherein the adjusting the minimum allotment and the maximum allotment for the active logical channel identification in the second pass comprises setting the maximum allotment and the minimum allotment to the remaining uplink grant size.

42. The computer program product of claim 39, wherein the computer-readable medium comprises code for selecting, by the radio link control layer, the packet size between the minimum allotment and the maximum allotment in order to reduce packet segmentation.

43. The computer program product of claim 39, wherein the minimum allotment and the maximum allotment provided to the radio link control layer for the active logical channel identification ensure that a priority bit rate is satisfied for the active logical channel identification.

44. The computer program product of claim 34, wherein the second set of functions comprises forming a medium access control packet data unit and submitting the medium access control packet data unit to a physical layer, wherein the second data comprise information on an amount of data sent in uplink for each active logical channel identification.

* * * * *